United States Patent
Baldovino et al.

(10) Patent No.: US 11,434,675 B2
(45) Date of Patent: Sep. 6, 2022

(54) VEHICLE STORAGE ASSEMBLY HAVING RESIDUAL MAGNETIC LATCHING MECHANISM

(71) Applicant: Ford Global Technologies, LLC, Dearborn, MI (US)

(72) Inventors: Segundo Baldovino, Novi, MI (US); Prashant Dubey, Canton, MI (US); Matthew Dennis Smith Boswell, Ferndale, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 602 days.

(21) Appl. No.: 16/561,353

(22) Filed: Sep. 5, 2019

(65) Prior Publication Data

US 2021/0071454 A1 Mar. 11, 2021

(51) Int. Cl.
| | |
|---|---|
| *B60R 7/06* | (2006.01) |
| *E05B 83/30* | (2014.01) |
| *E05C 19/16* | (2006.01) |
| *B60Q 3/225* | (2017.01) |
| *H01F 7/06* | (2006.01) |
| *B60R 11/00* | (2006.01) |

(52) U.S. Cl.
CPC ............ *E05C 19/166* (2013.01); *B60Q 3/225* (2017.02); *B60R 7/06* (2013.01); *E05B 83/30* (2013.01); *H01F 7/064* (2013.01); *B60R 2011/0005* (2013.01); *E05Y 2900/538* (2013.01); *H01F 2007/062* (2013.01)

(58) Field of Classification Search
CPC ......... E05C 19/166; B60Q 3/225; B60R 7/06; B60R 2011/0005; E05B 83/30; H01F 7/064; H01F 2007/062; E05Y 2900/538
USPC ...................................... 292/251.5
See application file for complete search history.

(56) References Cited

U.S. PATENT DOCUMENTS

| | | | | |
|---|---|---|---|---|
| 5,261,713 | A * | 11/1993 | Fischbach | E05C 19/166 292/DIG. 64 |
| 6,820,856 | B2 | 11/2004 | Grill | |
| 7,969,705 | B2 | 6/2011 | Dimig et al. | |
| 8,215,684 | B2 | 7/2012 | Whitens et al. | |
| 8,596,704 | B2 * | 12/2013 | Sielhorst | E05B 81/66 296/37.8 |
| 11,338,717 | B2 * | 5/2022 | Hodge | B60P 3/0257 |

(Continued)

OTHER PUBLICATIONS

"Touch Sensors Design Guide" by Atmel, 10620 D-AT42-04/09, Revised Apr. 2009, 72 pages, Copyrighted 2008-2009 Atmel Corporation.

*Primary Examiner* — Pinel E Romain
(74) *Attorney, Agent, or Firm* — Vichit Chea; Price Heneveld LLP

(57) ABSTRACT

A vehicle storage assembly of the vehicle is provided. The vehicle storage assembly if the vehicle includes a storage compartment comprising an opening to permit access to the compartment, a door proximate the opening and movable between an open position and a closed position, a latching mechanism comprising a residual magnet for latching a door in the closed position in a first magnetic state and for releasing the door to open to the open position in a second magnetic state, and a proximity switch for activating the latching mechanism to allow the door to move to the open position.

20 Claims, 8 Drawing Sheets

(56) References Cited

U.S. PATENT DOCUMENTS

| | | | |
|---|---|---|---|
| 2004/0041414 A1* | 3/2004 | Mandall | E05C 19/166 292/251.5 |
| 2015/0211270 A1* | 7/2015 | Benhammou | H01F 7/1811 361/156 |
| 2015/0254916 A1* | 9/2015 | Hara | G07C 9/00309 340/5.61 |
| 2021/0062557 A1* | 3/2021 | Sukumar | E05B 83/32 |
| 2022/0010599 A1* | 1/2022 | Dalton | E05B 81/08 |

* cited by examiner

VEHICLE STORAGE ASSEMBLY HAVING RESIDUAL MAGNETIC LATCHING MECHANISM

FIELD OF THE INVENTION

The present invention generally relates to vehicle storage compartments, and more particularly relates to a storage compartment closure assembly having a magnetic latch mechanism for latching a closure member on a vehicle.

BACKGROUND OF THE INVENTION

Automotive vehicles are commonly equipped with storage compartments. For example, vehicles typically include a glove compartment located in the dash on the front passenger side of the passenger compartment. The glove compartment typically includes a pivoting door connected to a housing body such that the lid pivots between open and closed positions. A latch assembly typically latches the door in the closed position. It may be desirable to provide for alternative latching assemblies that reduce the number of moving mechanical components.

SUMMARY OF THE INVENTION

According to one aspect of the present disclosure, a vehicle storage assembly is provided. The vehicle storage assembly includes a storage compartment comprising an opening to permit access to the compartment, a door proximate the opening and movable between an open position and a closed position, a latching mechanism comprising a residual magnet for latching the door in the closed position in a first magnetic state and for releasing the door to open to the open position in a second magnetic state, and a proximity switch for activating the latching mechanism to allow the door to move to the open position.

Embodiments of the first aspect of the invention can include any one or a combination of the following features:
- the latching mechanism further comprises a rotor and a stator that form the residual magnet to apply an axial magnetic force to attract the rotor to the stator in the first magnetic state;
- the rotor has an interlocking feature that matingly engages an interlocking feature on the stator in the latched position and prevent transverse movement of the rotor relative to the stator;
- the rotor is located on the door and the stator is located on a housing of the storage compartment;
- the proximity switch comprises a capacitive switch;
- the capacitive switch is located on the door;
- the capacitive switch activates the residual magnet between first and second magnetic states;
- the capacitive switch comprises an illuminated surface;
- the door is pivotally connected to the compartment by way of a hinge; and
- the storage compartment comprises a vehicle glove compartment.

According to another aspect of the present disclosure, a vehicle storage assembly is provided. The vehicle storage assembly includes a storage compartment comprising an opening to permit access to the compartment, a door proximate the opening and movable between an open position and a closed position, and a latching mechanism comprising a residual magnet comprising a stator that axially engages a rotor based on magnetism of the residual magnet for latching a door in a closed position in a first magnetic state and for releasing the door to open to the open position in a second magnetic state, wherein the stator and rotor prevent transverse movement.

Embodiments of the second aspect of the invention can include any one or a combination of the following features:
- a proximity switch for activating the latching mechanism to allow the door to move to the open position;
- the rotor has an interlocking feature that matingly engages an interlocking feature on the stator in the latched position and prevent transverse movement of the rotor relative to the stator;
- the rotor is located on the door and the stator is located on the storage compartment;
- the proximity switch comprises a capacitive switch;
- the capacitive switch is located on the door;
- the capacitive switch activates the residual magnet between first and second magnetic states;
- the capacitive switch comprises an illuminated surface;
- the door is pivotally connected to the compartment by way of a hinge; and
- the storage compartment comprises a vehicle glove compartment.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
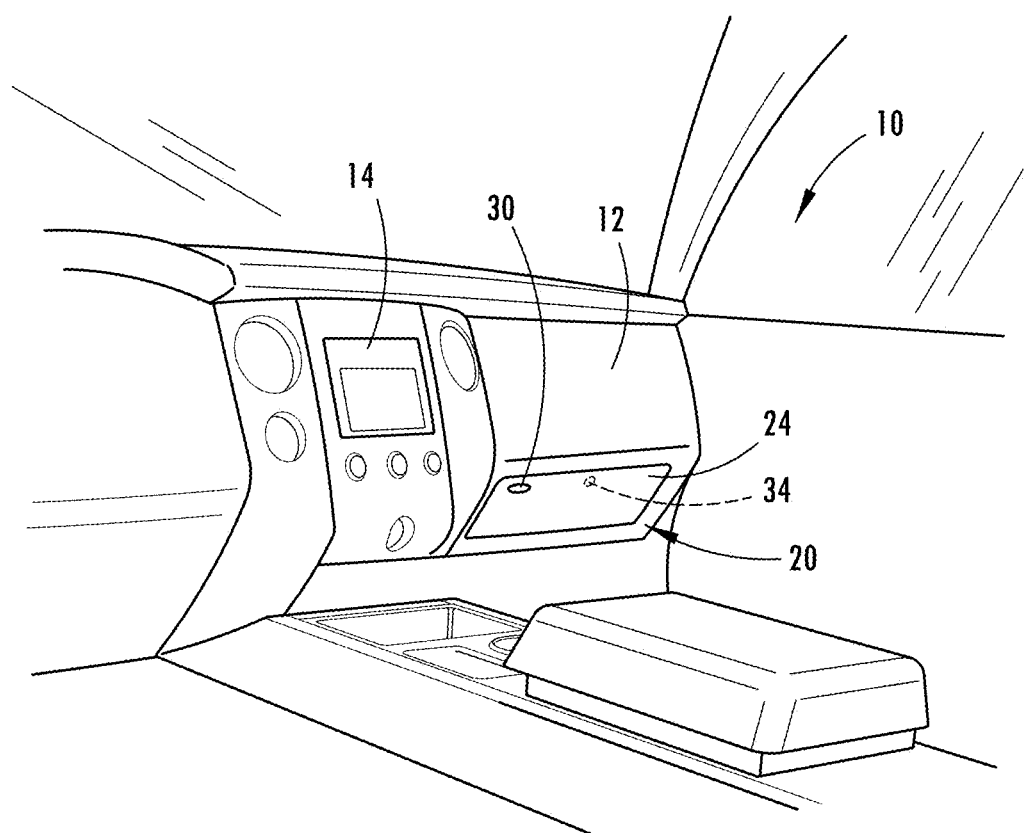
FIG. 1 is a perspective view of a passenger compartment of a vehicle equipped with a storage assembly having a residual magnetic latching mechanism, according to one embodiment.
Figure 2:
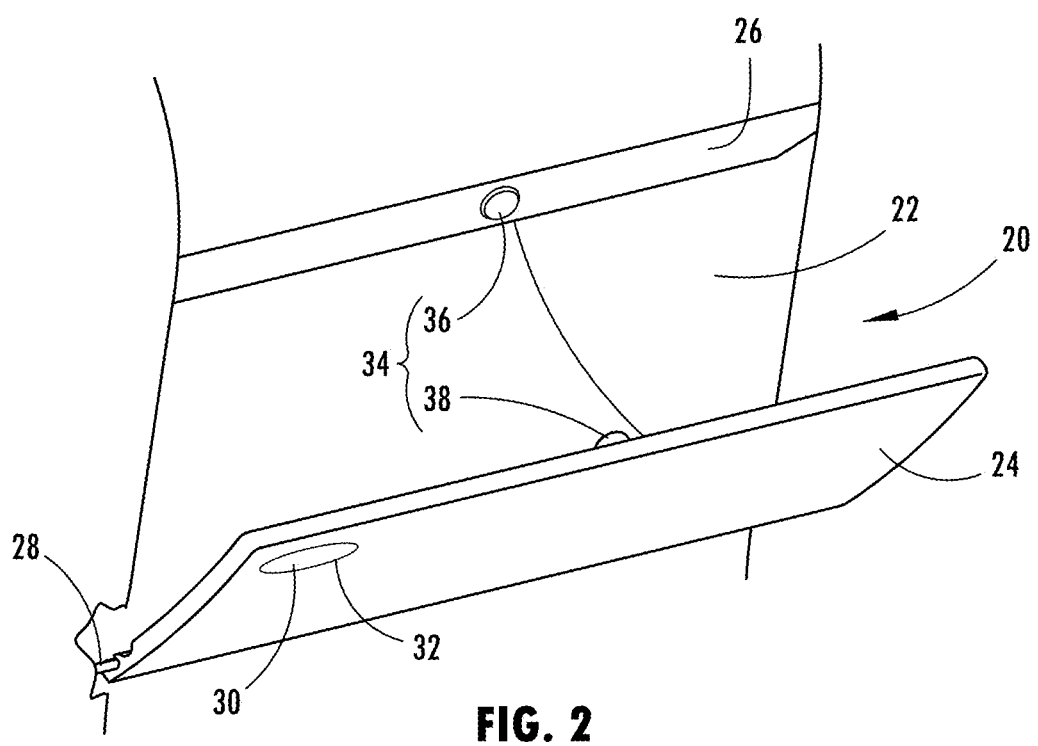
FIG. 2 is an enlarged perspective view of the storage assembly shown in FIG. 1 with the door shown in the open position.
Figure 3:
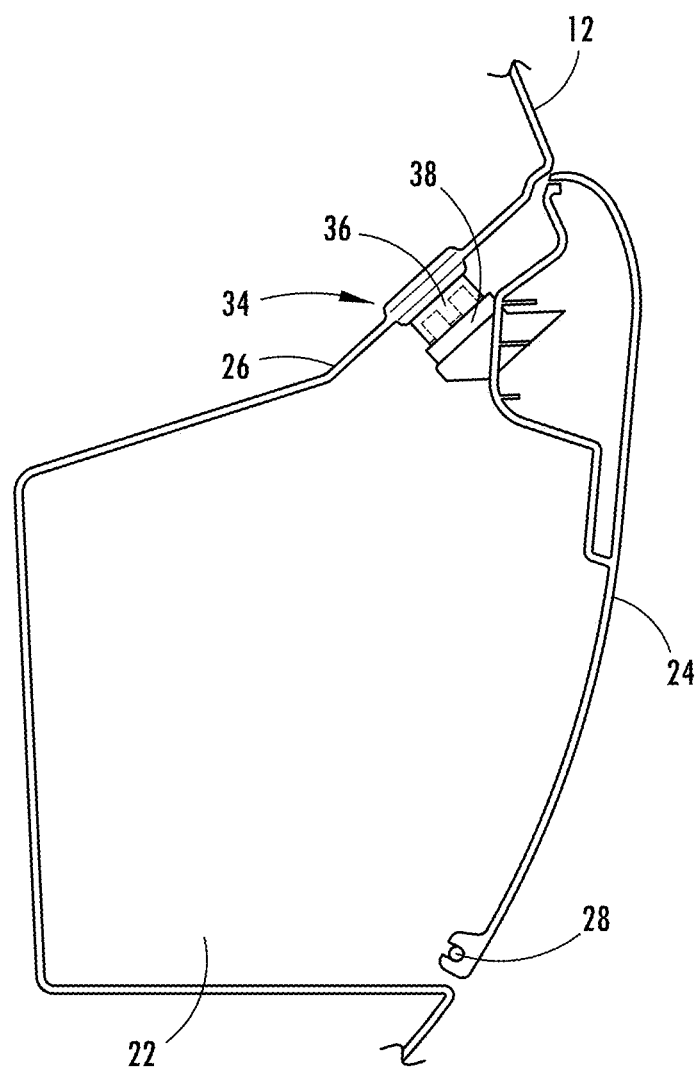
FIG. 3 is a side sectional view of the storage assembly with the door shown in the closed position.
Figure 4:
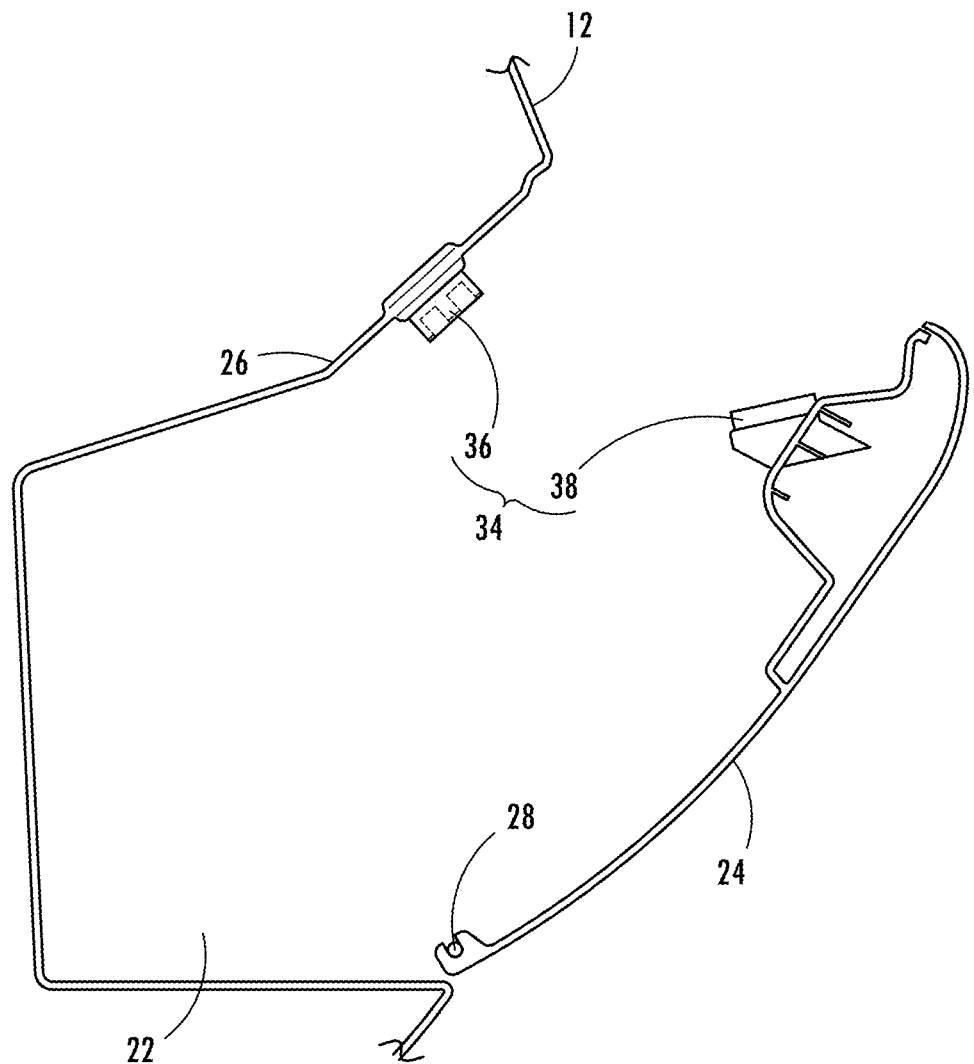
FIG. 4 is a side sectional view of the storage assembly with the door shown in the open position.
Figure 5:
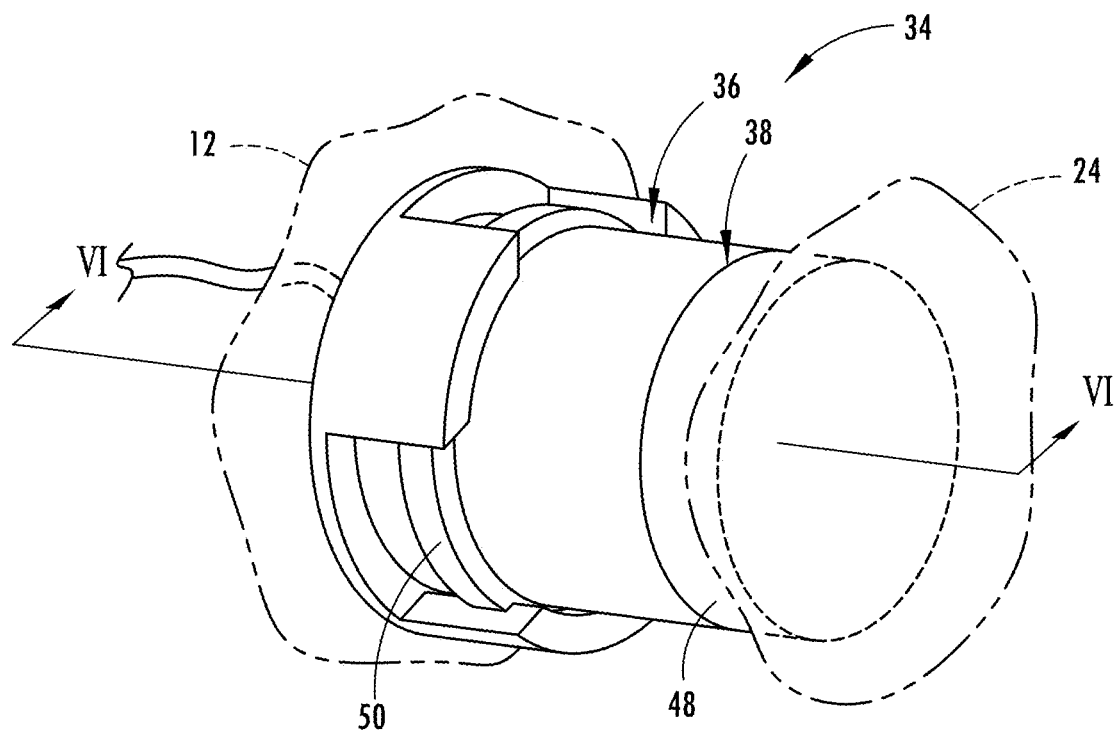
FIG. 5 is an enlarged perspective view of the residual magnetic latching mechanism having a stator and rotor assembly.
Figure 6:
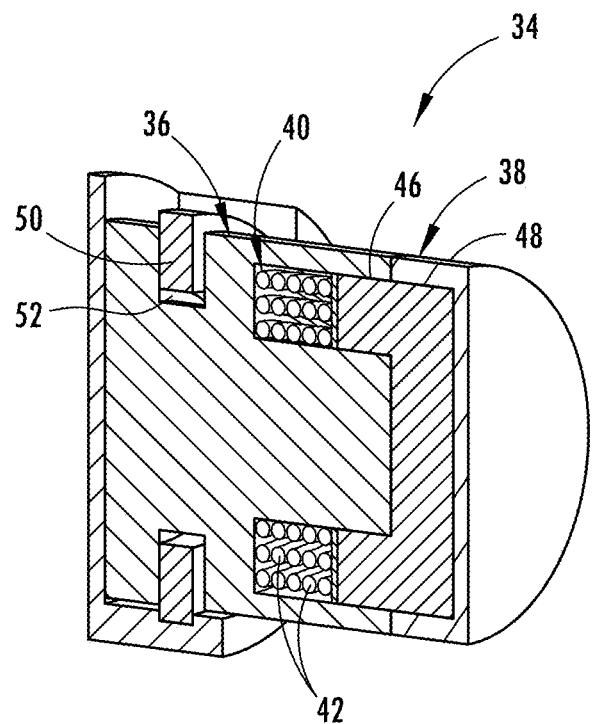
FIG. 6 is a cross-sectional view taken through line VI-VI of FIG. 5 further illustrating the rotor and stator assembly.
Figure 7:
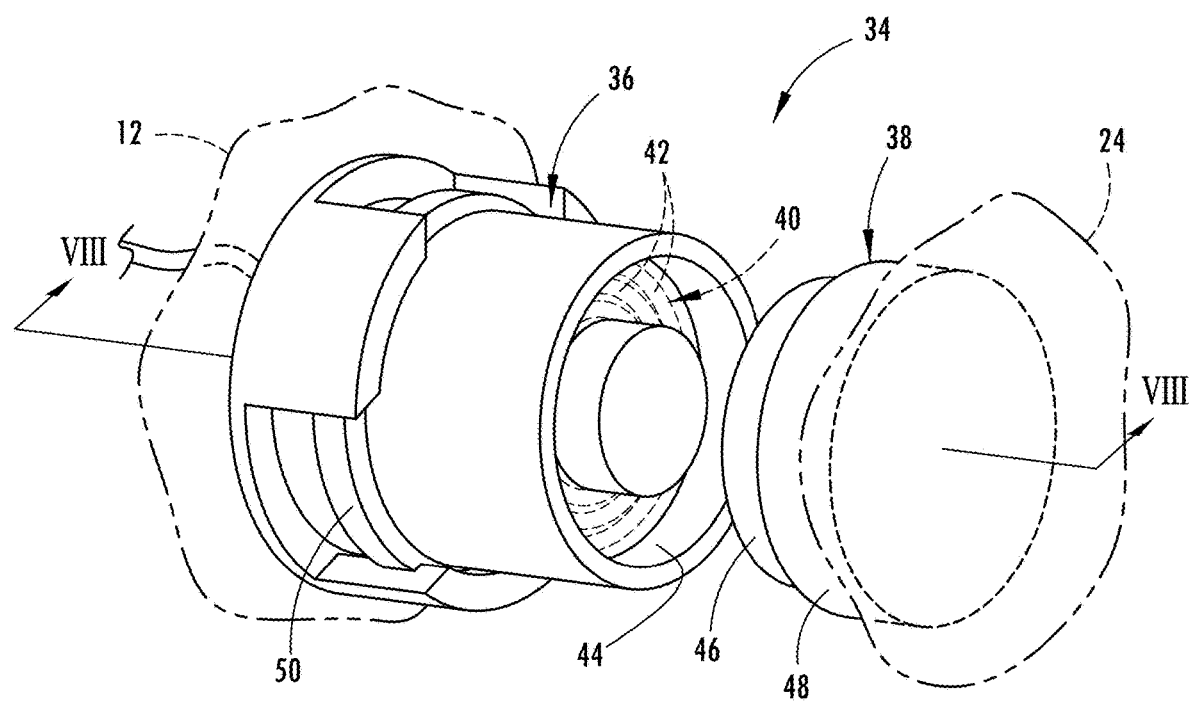
FIG. 7 is an exploded perspective view of the rotor and stator assembly.
Figure 8:
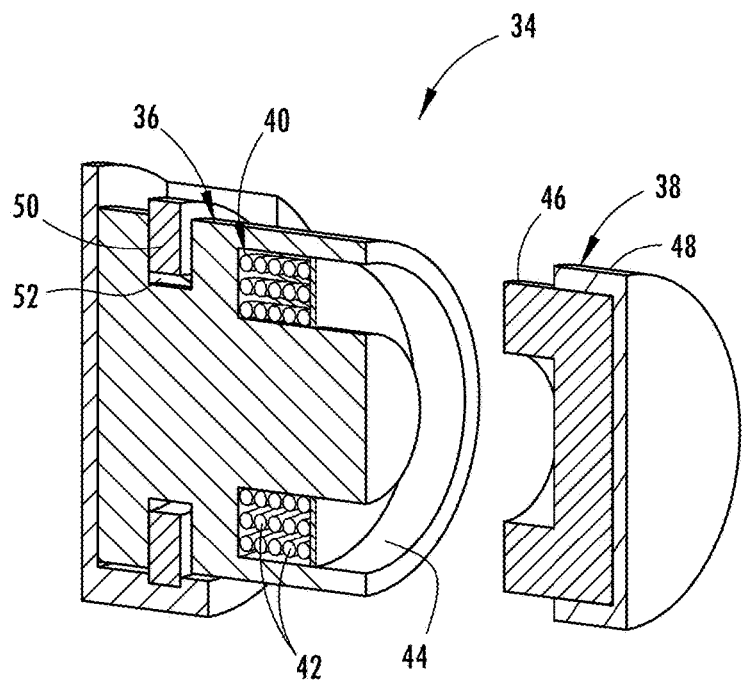
FIG. 8 is an exploded cross-sectional view of the rotor and stator assembly.

Referring to FIG. 1, the passenger compartment of an automotive vehicle 10 is generally illustrated having a storage assembly 20 generally installed within the dash 12 of the vehicle 10, generally forward of the passenger side of the vehicle compartment. The storage assembly 20 is commonly referred to as a glove box or glove compartment and is generally made available for storing items inside of the vehicle 10. The storage assembly 20 employs a latching mechanism configured with a residual magnet and a proximity switch for opening and closing the storage assembly 20, according to the embodiment shown. While a glove compartment is generally illustrated as the vehicle storage assembly 20, it should be appreciated that the latching mechanism may be employed on other storage assemblies, such as the center console storage bin and other compartments that have a door that moves or pivots between closed and open positions to control access to the storage compartment.

Referring to FIGS. 1-4, the vehicle storage assembly 20 is generally illustrated having a storage compartment 22 and an opening to permit access to the storage compartment 22. The compartment 22 generally has a housing 26 that includes walls on the bottom, sides and back that define the size and shape of the storage compartment 22. The storage assembly 20 also has a door 24 proximate to the opening to allow access to the opening in an open door position and to close the opening in a closed door position. The door 24 is pivotally connected to the housing via a hinge 26 proximate the lower end of the door 24 to allow the door 24 to pivot between the open position shown in FIGS. 2 and 4 and the closed position shown in FIGS. 1 and 3.

The vehicle storage assembly 20 has a storage compartment 22 comprising the opening to permit access to the storage compartment 22 and the door 24 is located proximate the opening and movable between the open position and the closed position. The vehicle storage assembly 20 includes a latching mechanism 34 comprising a residual magnet for latching the door 24 in the closed position to hold the door 24 closed in the closed position when the residual magnet is in a first magnetic state and for releasing the door 24 to open the door 24 or allow the door 24 to move to an open position when the residual magnet is in a second magnetic state. The latching mechanism 34 is activated in response to a user input detected by a proximity switch 30 for activating the latching mechanism 34 to allow the door 24 to move to the open position.

The latching mechanism 34 is shown having a stator 36 and a rotor 38 that have a residual magnetic attraction when configured in the first magnetic state and no magnetic attraction when configured in the second magnetic state. In one embodiment, the stator 36 is located in the housing 26 proximate to the storage compartment opening and the rotor 38 is located on the interior surface of the door 24 and is aligned to matingly engage with the stator 36 when the door 24 is in the closed position. The rotor 38 and stator 36 may be molded in the housing 26 and interior surface of the door 24. However, the stator 36 could be located on the door 24 and the rotor 38 could be located on the housing 26, according to another embodiment. With the door 24 in the closed position, the rotor 38 and stator 36 when configured in the first magnetic state attract and thereby engage with one another due to an axial magnetic force to provide an axial holding force to hold the door 24 in the closed position. The axial holding force is generated based on a residual magnetism which does not require continued or continuous electric power supplied to the stator 36. When a voltage is applied to the residual magnet located in the stator 36, the magnetic poles of the stator 36 and rotor 38 are aligned to magnetically attract the rotor 38 to the stator 36. When an opposite polarity voltage is applied, the magnetism is demagnetized in a degaussing process to reverse the polarity of the magnetic poles and to change to the second magnetic state such that the rotor 38 is not attracted the stator 36. One example of a residual magnetic locking device is disclosed in U.S. Pat. No. 7,969,705 which is hereby incorporated herein by reference.

The stator 36 and rotor 38 are configured to matingly engage one another when the door 24 is in the closed position. The residual magnetism provides an axial holding force due to magnetic attraction to hold the rotor and door 24 connected thereto to the stator 36 when the door 24 is in the closed position. The rotor 38 and stator 36 are configured with an interlocking features that prevents lateral movement of the rotor 38 relative to the stator 36. As such, the configuration of the rotor 38 and stator 36 prevents opening of the door 24 when lateral forces perpendicular to the axial alignment of the rotor 38 and stator 36 are exerted upon the door 24 and/or door housing 26. As such, unlatching or opening of the door 24 due to excessive lateral forces is thereby minimized or prevented.

The proximity switch 30 is shown located on the front side of the door 24, according to one embodiment. The proximity switch 30 in this embodiment is located on an illuminated emblem 32 or badge which may include a manufacturer's logo or other illuminated and/or displayed feature or features. As such, the proximity switch 30 has an illuminated surface which may be backlighting. It should be appreciated that the proximity switch 30 may be located elsewhere on the vehicle 10, such as on the vehicle dashboard 12, a console member, or other location.

The proximity switch 30 senses a user input such as a touch or swipe command and generates an output to activate the latching mechanism 34 to switch the magnetic state between the first and second magnetic states. According to one embodiment, the proximity switch 30 is configured as a capacitive switch. The capacitive switch 30 may be configured with first and second electrodes, according to one embodiment. Each of the first and second electrodes may have a plurality of electrode fingers which are arranged such that the electrode fingers of the first electrode are interdigitated with the electrode fingers of the second electrode, according to one example. The first and second electrodes form a capacitive sensor which generates a sense activation field to sense contact or close proximity of a user in relation to the one or more proximity sensors, such as a contact or swiping motion of a user's finger. Thus, the sense activation field of the proximity switch is a capacitive field in the exemplary embodiment and the user's finger has electrical conductivity and dielectric properties that cause a change or disturbance in the sense activation field as should be evident to those skilled in the art. However, it should be appreciated by those skilled in the art that additional or alternative types of proximity sensors can be used, such as, but not limited to, inductive sensors, optical sensors, temperature sensors, resistive sensors, the like, or a combination thereof. Exemplary proximity sensors are described in the Apr. 9, 2009 ATMEL® Touch Sensors Design Guide, 10620 D-AT42-04/09, the entire reference hereby being incorporated herein by reference.

The proximity switch 30 is provided as an input device to receive an input command to control the residual magnetic latching mechanism 34 to unlatch the latching mechanism 34 to open the door 24 when a user inputs a touch input command by contacting or being in close proximity to the proximity switch 30. When a user is detected providing an input command to the proximity switch 30, the magnetic state of the residual magnet formed by the stator 36 and rotor 38 is changed from the first magnetic state to the second magnetic state such that the rotor 38 is no longer attracted to the stator 36 to thereby allow the door 24 to be moved to the open position. When a user closes the door 24 by physically forcing the door 24 towards the closed position, the user may press on the proximity switch 30 which generates an input command to activate the proximity switch 30 which causes the magnetism of the stator 36 to switch back to the first magnetic state such that the stator 36 is forcibly attracted to the rotor 38 due to the residual magnetism. According to other embodiments, the switching of the residual magnet from the second magnetic state to the first magnetic state may occur when the door 24 approaches the housing as sensed by one or more other sensors such as door position sensors.

Referring back to FIG. 1, the vehicle 10 is shown equipped with a human machine interface (HMI) touchscreen 14 which is shown located generally forward of the center console in the dashboard 12. The HMI touchscreen display 14 may allow a user to input a valet lock code to lock and thereby prevent the door 24 from becoming unlatched due to an activation input of the proximity switch 30. This may be useful for when the vehicle 10 is operated by a valet service or other personnel that are not authorized to access the storage compartment 22. Additionally or alternatively, the vehicle 10 may be equipped with one or more keypads such as a key entry keypad or a keyless entry keypad or other input devices such as a biometric access device on the outside of the vehicle 10 or on the inside of the vehicle 10 that may allow a user to enter a code such as a valet lock code to prevent unauthorized access to the storage compartment 22.

The stator 36 and rotor 38 are further illustrated in FIGS. 5-8, according to one embodiment. The stator 36 has an induction coil 40 with multiple turns 42 wrapped around cylindrical core of the stator 36 for generating a residual magnetism that causes the stator 36 to have a positive or negative magnetic polarity, depending on the last application of a voltage signal applied to the induction coil 40. A first voltage (e.g., positive polarity voltage) applied to the stator 36 may cause electric current to flow in a first direction of the induction coil 40 and thereby apply a first magnetic polarity to the stator 36. The voltage may be switched to a second voltage (e.g., negative polarity voltage) to cause electric current to flow in the opposite second direction on the induction coil 40 to switch the magnetic polarity state to the second polarity state. The residual magnet does not require further electrical current once the magnetic state is set. The rotor 38 and stator 36 may be made of neodymium metal. When the rotor 38 and stator 36 have an opposite polarity, the rotor 38 and stator 36 are attracted to one another with magnetic attraction that remains during the residual magnetic state. When the stator 36 is degaussed or demagnetized, the rotor 38 and stator 36 there is no axial magnetic force such that they are not attracted to each other.

The rotor 38 and the stator 36 are configured with interlocking features that align to prevent translational (i.e., side to side) movement of the rotor 38 relative to the stator 36. As seen in FIGS. 5-8, the stator 36 has a generally circular portion with a ring-shaped cutout 44 that receives multiple coil turns 42 of a conductive element. The rotor 38 includes a disc-shaped top 48 and a downward extending ring portion 46. The downward extending ring portion 46 has a shape and size configured to be received within the ring-shaped slot 44 of stator 36. When downward extending portion 46 is received within slot 44, transverse (i.e., side to side) movement of the rotor 38 relative to the stator 36 is thereby prevented. In addition, the stator 36 further includes a bracket 50 within opening 52 for holding the stator 36 onto the housing 26 and resisting transverse movement of the stator 36 relative to the housing 26.

Figure 9:
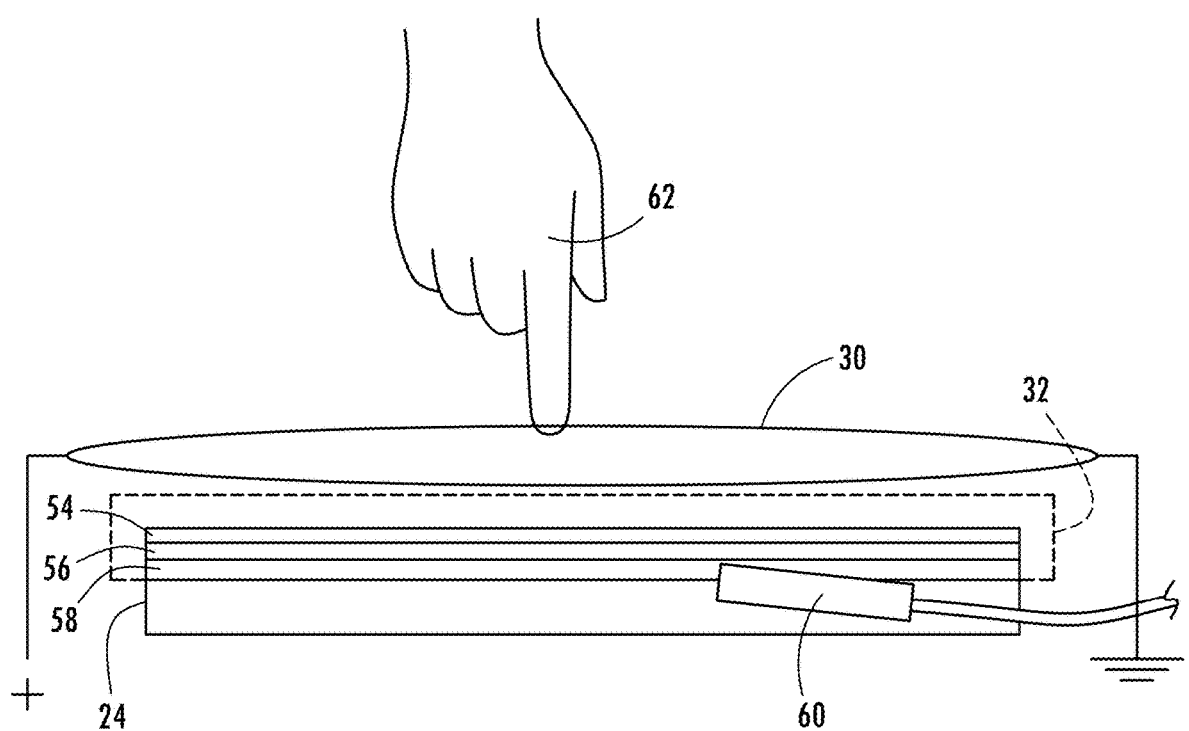
FIG. 9 is a sectional view of the proximity switch and backlight illumination employed on the storage assembly.

Referring to FIG. 9, the proximity switch 30 is generally illustrated provided on an illuminated emblem assembly 32, according to one embodiment. The emblem assembly 32 is one embodiment that generally includes a top visibly transparent coating layer 54 that allows light to transmit therethrough, a top coat layer 56 located below layer 54 and an illumination layer 58 that backlights the surface of the proximity switch 30 and illuminates the emblem. The illumination layer 58 may include one or more light sources such as light emitting diodes (LEDS) and an electroluminescent paint such as lumilor conductive bus bar paint located below layer 56. The emblem layer assembly 32 is located on top of a material making up the storage compartment. In addition, an electrical connector with wire leads 60 is embedded in the storage compartment material to provide wiring for the supply of electrical power and actuation of the illumination layer 58. It should be appreciated that forms of illumination and visible presentation of the capacitive switch 30 may be used.

Figure 10:
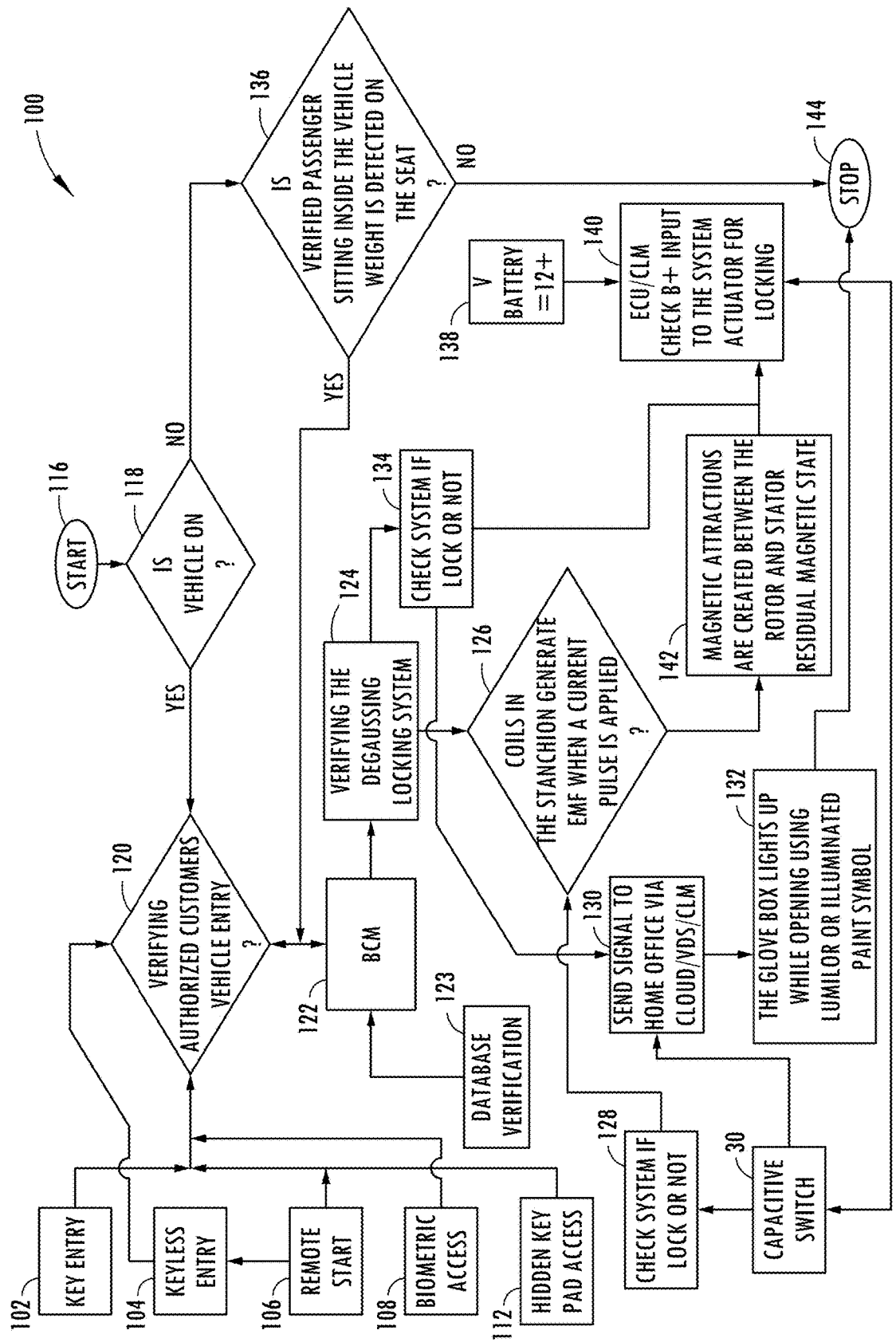
FIG. 10 is a flow diagram illustrating a method for controlling the latching mechanism to open the door of the storage assembly.

Referring to FIG. 10, the vehicle storage assembly is further illustrated, according to a block/flow diagram to perform a method 100 of controlling the latch mechanism, according to one example. In method 100, various signals may be received from a key entry keypad 102, keyless entry keypad 104, remote start 106, biometric access input 108, and a hidden keypad access 112. One or more of the various signals may be input to the body control module 122 or other control module such as a driver door module. Method 100 starts at step 116 and proceeds to step 118 to determine if the vehicle is turned on or in operation. If the vehicle is determined to be turned on, method 100 proceeds to decision step 120 to verify authorized customers for vehicle entry. Verification of an authorized customer or user may include verifying an authorized user entering a code or input via the keyless entry 104 or key entry 102, or remote start 106, or a biometric access 108 or the hidden keypad access 112. The results of the verification of the authorized customer are then passed onto the body control module in block 122 which may verify an authorized customer by looking up data in a database verification block 123.

Following the verification process, method 100 proceeds to step 124 to verify the degaussing locking system. Following step 124, method 100 may proceed to check the system to see if it is locked or not in step 134 and may also proceed to decision step 126. Following step 134, method 100 proceeds to block 140 where the electronic control unit ECU/CLM may check an input to the system actuator for locking the latching mechanism by applying a voltage from the battery source 138. The latching mechanism is in communication with the capacitive switch 30 and method 100 checks whether the system is locked or not at step 128.

In decision step 126, method 100 determines if the coils in the induction coil generate an electromagnetic frequency (EMF) when a current pulse is applied to set the stator in the first magnetic state. When the current pulse is applied, method 100 proceeds to step 142 where a magnetic attraction is created between the rotor and the stator in a residual magnetic state before proceeding to step 140. Following step 140, method 100 via the capacitive switch 30 sends a signal to a home office via a cloud, VDS or CLM and thereafter proceeds to step 132 where the glove box lights up while opening using illuminated paint symbols. Thereafter, method 100 stops at step 144.

If the vehicle is not turned on, method 100 proceeds to decision step 136 to determine if a verified passenger is sitting inside the vehicle by detecting weight of an occupant on the seat and, if detected, proceeds to verify the occupant is an authorized passenger. If not detected, method 100 ends.

Figure 11:
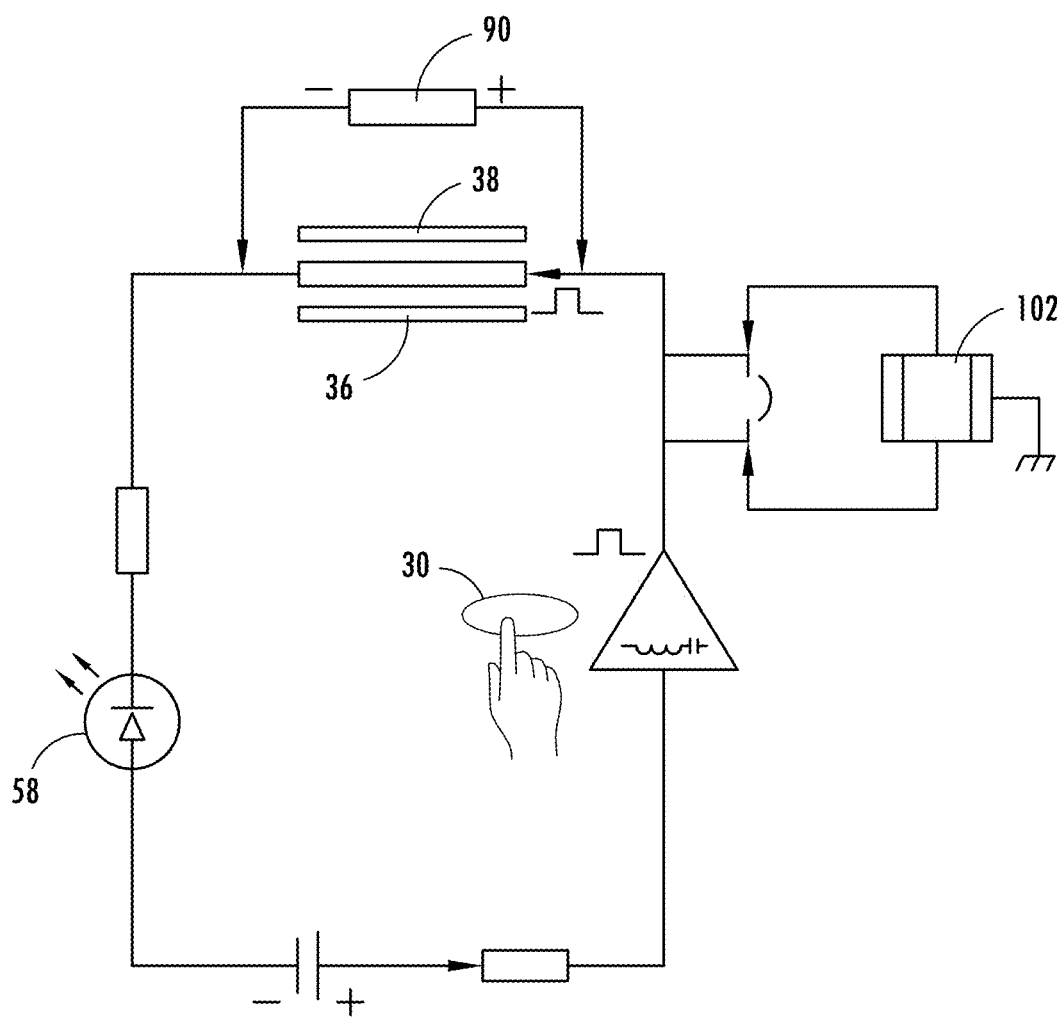
FIG. 11 is a circuit diagram for the proximity switch and latch mechanism controls, according to one embodiment.

Referring to FIG. 11, the proximity switch and light illumination circuitry are further illustrated, according to one example. A user's finger is shown interfacing with the proximity switch 30 which includes electrodes that are energized with a pulse width modulated signal to detect the proximity of a user inputting a command signal to the proximity switch 30. The light source 58 is further illustrated for illuminating light to backlight the proximity switch 30. It should be appreciated that the capacitive proximity switch may be configured with multiple or single electrodes in a number of different ways. Activation of the proximity switch generates a signal, which in turn, is used to control the residual magnetism of the residual magnet shown by rotor 38 and stator 36 to switch the residual magnet between the first magnetic state and the second magnetic state. The circuit includes a reed switch 90 coupled across the residual magnet which may be used to switch between first and second magnetic states when a magnetic field is applied. A keypad 102 is also shown in the circuit.

Accordingly, the vehicle storage assembly advantageously provides for a latching mechanism that employs a residual magnet to open and close the door and a proximity switch for activating the latching mechanism to allow the door to move to the open position. Further, the vehicle storage system advantageously prevents or reduces transverse movement between the rotor and stator to thereby prevent inadvertent or unwanted opening of the door.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle storage assembly comprising:
   a storage compartment comprising an opening to permit access to the compartment;
   a door proximate the opening and movable between an open position and a closed position;
   a latching mechanism comprising a residual magnet for latching the door in the closed position in a first magnetic state and for releasing the door to open to the open position in a second magnetic state; and
   a proximity switch for activating the latching mechanism to allow the door to move to the open position.

2. The vehicle storage assembly of claim 1, wherein the latching mechanism further comprises a rotor and a stator that form the residual magnet to apply an axial magnetic force to attract the rotor to the stator in the first magnetic state.

3. The vehicle storage assembly of claim 2, wherein the rotor has an interlocking feature that matingly engages an interlocking feature on the stator in the latched position and prevent transverse movement of the rotor relative to the stator.

4. The vehicle storage assembly of claim 3, wherein the rotor is located on the door and the stator is located on a housing of the storage compartment.

5. The vehicle storage assembly of claim 1, wherein the proximity switch comprises a capacitive switch.

6. The vehicle storage assembly of claim 5, wherein the capacitive switch is located on the door.

7. The vehicle storage assembly of claim 5, wherein the capacitive switch activates the residual magnet between first and second magnetic states.

8. The vehicle storage assembly of claim 1, wherein the capacitive switch comprises an illuminated surface.

9. The vehicle storage assembly of claim 1, wherein the door is pivotally connected to the compartment by way of a hinge.

10. The vehicle storage assembly of claim 1, wherein the storage compartment comprises a vehicle glove compartment.

11. A vehicle storage assembly comprising:
    a storage compartment comprising an opening to permit access to the compartment;
    a door proximate the opening and movable between an open position and a closed position; and
    a latching mechanism comprising a residual magnet comprising a stator that axially engages a rotor based on magnetism of the residual magnet for latching a door in a closed position in a first magnetic state and for releasing the door to open to the open position in a second magnetic state, wherein the stator and rotor prevent transverse movement.

12. The vehicle storage assembly of claim 11 further comprising a proximity switch for activating the latching mechanism to allow the door to move to the open position.

13. The vehicle storage assembly of claim 12, wherein the rotor has an interlocking feature that matingly engages an interlocking feature on the stator in the latched position and prevent transverse movement of the rotor relative to the stator.

14. The vehicle storage assembly of claim 13, wherein the rotor is located on the door and the stator is located on the storage compartment.

15. The vehicle storage assembly of claim 11, wherein the proximity switch comprises a capacitive switch.

16. The vehicle storage assembly of claim 15, wherein the capacitive switch is located on the door.

17. The vehicle storage assembly of claim 15, wherein the capacitive switch activates the residual magnet between first and second magnetic states.

18. The vehicle storage assembly of claim 11, wherein the capacitive switch comprises an illuminated surface.

19. The vehicle storage assembly of claim 11, wherein the door is pivotally connected to the compartment by way of a hinge.

20. The vehicle storage assembly of claim 11, wherein the storage compartment comprises a vehicle glove compartment.

* * * * *